Sept. 29, 1970 J. A. F. HILL 3,531,764
WIND COMPENSATED ACOUSTIC DIRECTION FINDER
Filed May 12, 1969 2 Sheets-Sheet 1

INVENTOR.
JACQUES A. F. HILL
BY Robert Van Epps
AGENT

United States Patent Office 3,531,764
Patented Sept. 29, 1970

3,531,764
WIND COMPENSATED ACOUSTIC DIRECTION FINDER
Jacques A. F. Hill, Lincoln, Mass., assignor to Sanders Associates, Inc., Nashua, N.H., a corporation of Delaware
Filed May 12, 1969, Ser. No. 823,567
Int. Cl. G01s 3/00
U.S. Cl. 340—16                                     11 Claims

ABSTRACT OF THE DISCLOSURE

A wind compensated acoustic direction finder comprises an orthogonal array of acoustic sensors and at least two cooperating acoustic energy sources at known bearings from said array. Each source emits a narrow band continuous wave signal at a preselected frequency. The cooperative source signal phase shift across individual microphone pairs due to steady state winds and local air turbulence is computed and applied as a corrective signal to the direction finder output signal which is representative of the relative bearing of a remote uncooperative acoustic source.

BACKGROUND OF THE INVENTION

Field of the invention

The present invention relates generally to the field of acoustics and more particularly to a method and apparatus for compensating the output of an acoustic direction finder for errors due to wind and air turbulence.

Description of the prior art

A wide variety of acoustic direction finders have been developed which determine the relative bearing of a remote sound source by measuring the transit time of the sound wave across an array of two or more microphones. Although such systems operate satisfactorily under calm air conditions the transit time of the wave depends upon the local wave direction and velocity at the array which is affected by both steady state winds and air turbulence. The effect of wind is to add a convection velocity to the sound wave and that of air turbulence is to make this convection velocity variable along the sound path and variable with time. These effects operate to introduce errors on the order of 40 milliradians or more under typical conditions into the bearing measured by the prior art systems.

OBJECTS AND SUMMARY OF THE INVENTION

It is therefore a primary object of the present invention to provide a new and improved acoustic direction finding apparatus wherein the effects of wind and turbulence are compensated.

It is another object of the present invention to provide apparatus of the above described character wherein said compensation is substantially instantaneous.

It is a further object of the present invention to provide apparatus of the above described character which said compensation is performed automatically.

The foregoing as well as other objectives of the present invention are achieved by providing an orthogonally disposed four microphone array with at least two cooperating continuous wave acoustic energy sources; one disposed at a known distance on each axis of said array. The apparent bearings of the cooperative sources are measured by means of the phase shift of the respective signals in the microphone pairs. The time-average of the phase shift in a given microphone pair represents the bearing error due to steady wind and the instantaneous phase shift represents the error due to turbulence. Signals proportional to the steady state and fluctuating bearing errors are applied to the output of the direction finder thereby compensating for the errors due to wind and turbulence.

These and other objects, features and advantages of the present invention will become more apparent from the following detailed description taken in conjunction with the appended drawings.

DESCRIPTION OF PREFERRED EMBODIMENT

Figure 1:
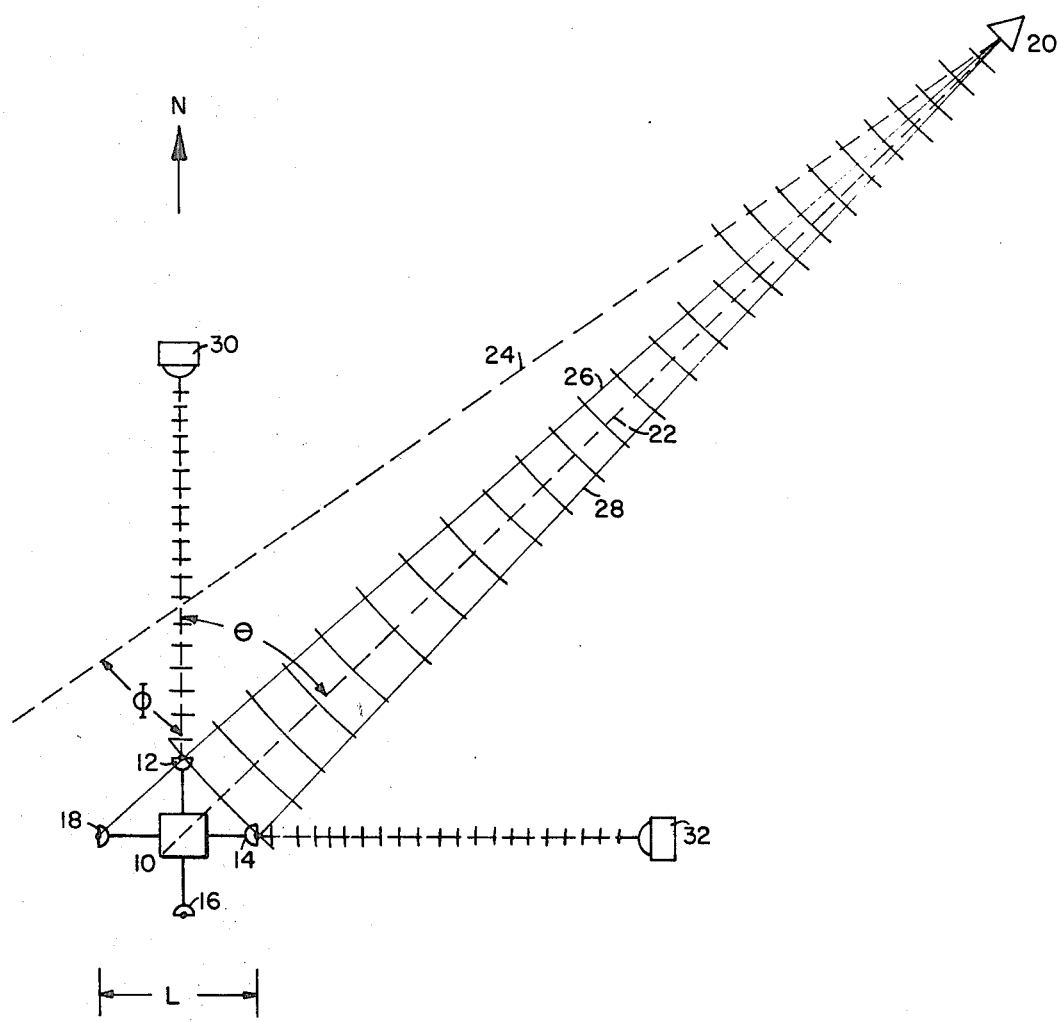
FIG. 1 is a diagrammatic illustration of the physical disposition of the elements of the present invention.

Turning now to FIG. 1 there is illustrated a conventional acoustic direction finder 10 having a four microphone 12, 14, 16 and 18 array oriented in the N, E, S and W directions respectively. The bearing $\Theta$, of a remote sound source 20 may be calculated from the time it takes the sound waves to transit the distance between any opposed pair of microphones. For example, the bearing angle solution as determined using microphones 14 and 18 is $$\Theta = \sin^{-1}(cT/L) \qquad (1)$$

where $c$ is the speed of sound, which is assumed to be uniform over the sound path 22, T is the time interval between detection of the sound wave by microphones 14 and 18 and L is the distance between the microphones.

The effect of wind blowing for example along path 24 is to add a convection velocity to the sound speed and thus introduce an error, $\Delta T$, in the uncompensated transit time, T, which may be expressed for microphone pair 14-18 as $$\Delta T = -(LV/C^2) \sin \varphi \qquad (2)$$

where v is the wind velocity, C is the velocity of sound, $\varphi$ is the angle between the wind direction and the perpendicular to the baseline 14-18, herein illustrated as North. It is to be noted that the wind error to be corrected is independent of range and target bearing.

A bearing error due to air turbulence is also introduced in that the convection velocity of the sound wave along the sound path is made variable with position and with time. Near the sound source 20 the sound paths such as 26 and 28 to any two opposed microphones 14 and 18 of the array are close together and the error introduced is necessarily small. The significant contribution to the bearing error caused by turbulent fluctuation of the time interval between detection of the sound wave by the opposed microphones thus is produced in that portion of the atmosphere near the microphone array 10. It is convenient to divide the turbulence convection velocities into E-W and N-S components thereby permitting approximation of the fluctuation in sound wave transit time by integrations along the central path 22 between the array 10 and remote source 20 of the instantaneous velocity differences between the two rays 26 and 28.

The present invention contemplates apparatus for use in combination with a conventional acoustic direction finder to provide measurement of the instantaneous error in terms of the apparent bearing of two cooperating sound sources 30 and 32 disposed at known bearings from the array 10. The apparent bearings of sources 30 and 32 are detected and compared to their known bearings and corresponding wind and turbulence error corrections are provided for application to the apparent bearing angle of a remote sound source.

Two cooperating sound sources 30 and 32 are required in the practice of the present invention and are preferably disposed along the N–S and E–W axes of the microphone array 10 although any relative bearings are satisfactory provided they are known. Ideally, these sources should be placed as far from the array as a typical target, however, in practice they may simply be placed as far out as practical. Each source 30 and 32 emits a narrow band continuous wave signal at some frequency remote from the peak frequency in the target spectrum. The bearing error thus may be computed from the phase shift of the CW signal from the cooperating sources 30 and 32 across the respective opposed microphone pairs 14–18 and 12–16.

The time-average of the phase shift in either microphone pair is thus representative of the transit time error, $\Delta T$, due to a steady wind and may be expressed as $$\Delta T = \Delta \Psi / 2\pi f \qquad (3)$$

where $\Delta \Psi$ is the phase shift and $f$ is the frequency of the cooperating source.

The fluctuating part of the phase shift represents the bearing error due to turbulence in the immediate vicinity of the microphone array.

The steady and fluctuating phase shifts of the cooperating source signals are the basis for a determination of the velocity and direction of the mean wind and yield approximate information about the intensity and scale of air turbulence in the vicinity of the microphone array. The instantaneous error measured with the know sources may be separated into steady and fluctuating components and then be applied directly in the appropriate output quadrants of the array 10.

Figure 2:
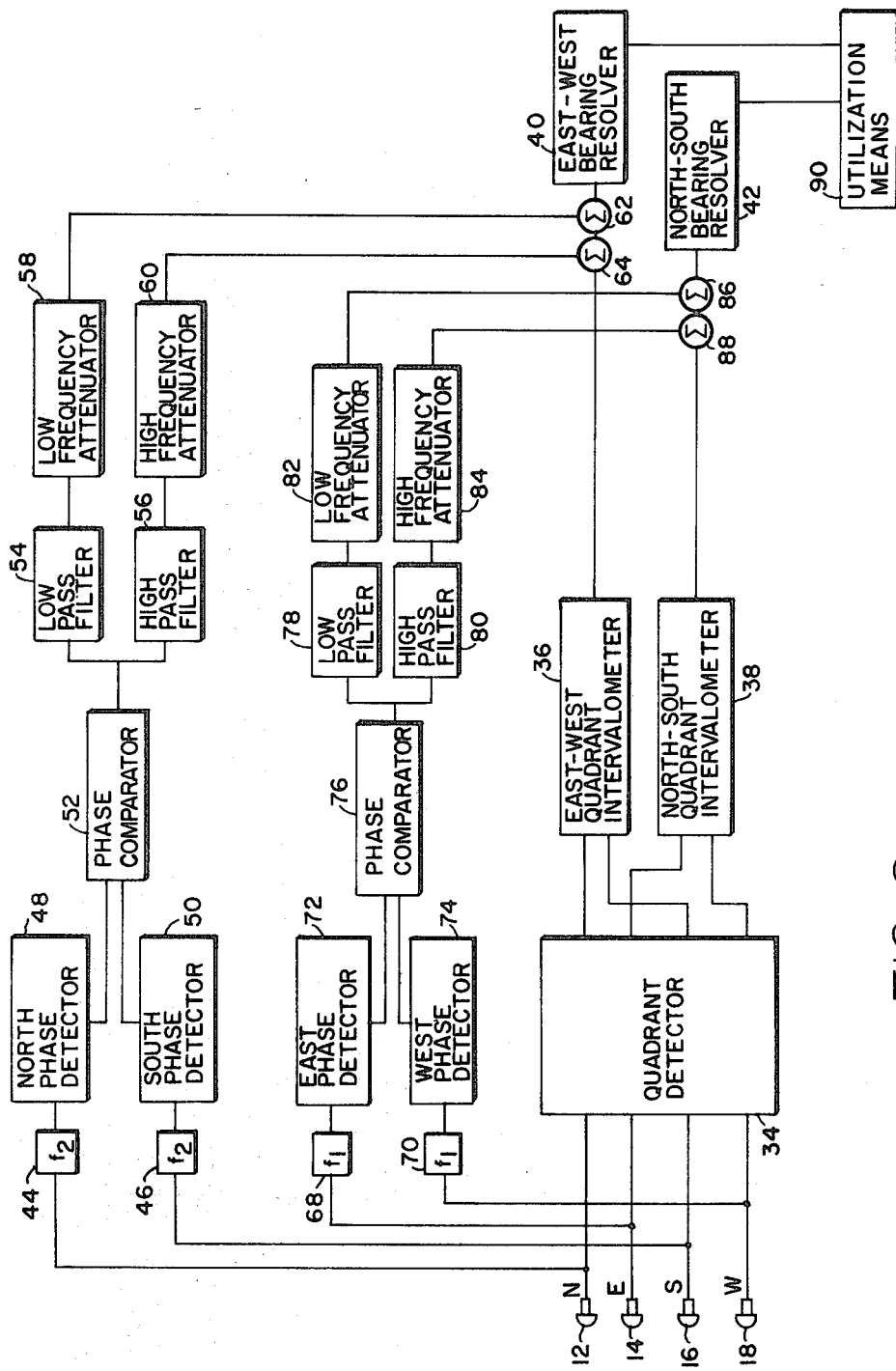
FIG. 2 is a schematic block diagram of an embodiment of the present invention.

FIG. 2 is a schematic block diagram of the apparatus of the present invention whereby the bearing error due to wind and turbulence is provided and a compensating signal applied to the bearing angle of a detected target. The microphone array comprising microphones 12, 14, 16 and 18 is coupled to a quadrant detector 34 which determines the quadrant of arrival of a target signal and routes it to one of two intervalometers 36 and 38 corresponding to the east-west quadrants and north-south quadrants. The output signals from the intervalometers represent the uncorrected transit times of the sound wave from the target across each pair of microphones 14–18 and 12–16 and in the prior art are applied directly to east-west and north-south bearing resolvers 40 and 42 respectively.

As stated hereinabove each of the cooperating sources 30 and 32 emit narrow band CW signals. For the purposes of illustration the frequences of these signals are designated $f_1$ and $f_2$ respectively. The signal at $f_1$ from source 30 is detected by microphones 18 and 14 and the electrical signal therefrom is coupled through narrow band pass filters 68 and 70 which have center frequencies of $f_1$ to east and west phase detectors 72 and 74 respectively. The outputs of the east and west phase detectors are applied to a first phase comparator 76 the output of which is proportional to the phase shift of the $f_1$ signal across microphones 18 and 14 and thus representative of the instantaneous east-west component of the transit time error due to the combined wind and turbulence. The wind and turbulence errors are separated by low pass filter 78 and high pass filter 80 respectively. The low pass filter may for example have a cutoff frequency of 1.0 Hz. and thus pass only those signals which are essentially nonfluctuating and thus representative of the steady wind error component in the north or south quadrant. The wind error signal from the low pass filter 78 may thus be applied through the attenuator 82 and summing amplifier 86 to the transit time signal for the north and south quadrants.

The high pass filter 80 may for example have a cut-on frequency of 1.0 Hz. and thus pass only fluctuating signals representative of the turbulence error in the north and south quadrants. The turbulence error signal from the high pass filter 80 may thus be applied through the attenuator 84 and summing amplifier 88 to the transit time signal for the north and south quadrants. The transit time signal from the north-south quadrant intervalometer 38 which is passed through both summing amplifiers 86 and 88 is thus compensated for both wind and turbulence before being applied to bearing resolver 42.

The east-west wind and turbulence correction signals are produced and applied in a manner which is directly analogous to those on the north-south axis.

The CW acoustic signal at $f_2$ is detected by microphones 12 and 16 the outputs of which are applied through narrow bandpass filters 44 and 46 to north and south phase detectors 48 and 50 respectively. The phase shift of the $f_2$ signal across microphones 12 and 16 is determined in a phase comparator 52 which produces an output signal representative of the instantaneous north-south component of the transit time error due to the combined wind and turbulence. The north-south wind and turbulence errors are again separated by low pass filter 54 and high pass filter 56 respectively. The output of low pass filter 54 represents the east or west quadrant wind error and may be applied through attenuator 58 and summing amplifier 62 to the east-west quadrant intervalometer 36 output. The output of high pass filter 56 represents the east-west turbulence error and may be applied through attenuator 60 and summing amplifier 64 to the intervalometer 36 output signal for the east and west quadrants. The transit time signal from intervalometer 36 which is passed through both summing amplifiers 64 and 62 is thus compensated for both wind and turbulence errors prior to being applied to bearing resolver 40.

The compensated output signals from bearing resloves 40 and 42 are then coupled to a target bearing indicator or any other suitable utilization means 90.

It will be apparent from the foregoing description that the applicant has provided a new and novel wind compensated acoustic direction finder whereby the objectives set forth hereinabove are efficiently attained. Since certain changes may be made in the above construction without departing from the scope of the invention it is intended that all matter contained in the foregoing description or shown in the appended drawings be construed as illustrative and not in a limiting sense.

Having described what is new and novel and desired to secure by Letters Patent what is claimed is:

1. An improved acoustic direction finding apparatus of the type having an array of first and second orthogonally disposed pairs of opposed acoustic sensors and providing orthogonal first and second output signals corresponding to the relative bearing of an uncooperative remote sound source as a function of the transit time of a sound wave across said pairs of opposed acoustic sensors, wherein said improvement comprises first and second cooperating acoustic energy sources each said source disposed at a known distance and bearing relative to said array and emitting acoustic wave energy of a preselected frequency in the direction of said array, first and second means for detecting the phase shift of said acoustic wave energy from said cooperating sources across each pair of opposed acoustic sensors to thereby provide first and second signals representative of the orthogonal errors in said acoustic wave transit time due to wind and turbulence, and means for applying said first and second error signals to said first and second output signals of said array to thereby compensate said output signals for said wind and turbulence errors.

2. Apparatus as recited in claim 1 further including
first and second means coupled to said first and second phase shift detecting means respectively for separating said phase shift into fluctuating and substantially non-fluctuating components representative of said turbulence error and said wind error respectively.

3. Apparatus as recited in claim 1 wherein
each said cooperating acoustic energy source is disposed on an orthogonal axis of said array.

4. Apparatus as recited in claim 1 wherein
said first and second cooperating acoustic energy sources emit first and second narrow band continuous wave acoustic signals respectively.

5. Apparatus as recited in claim 4 wherein
each said continuous wave acoustic signal is of a frequency other than the peak frequency of said uncooperative remote sound source to be detected.

6. Apparatus as recited in claim 1 wherein
said phase shift across said first of opposed acoustic sensors provides a first error signal which is applied to said second output of said array, and
said phase shift across said second pair of opposed acoustic sensors provides a second error signal which is applied to said first output of said array.

7. Apparatus as recited in claim 4 further including
a narrow bandpass filter coupled to each acoustic sensor of said first and second orthogonally disposed sensor pairs
the center frequency of said filters coupled to the acoustic sensors of said first pair being the frequency of said first cooperating acoustic energy source, and
the center frequency of said filters coupled to the acoustic sensors of said second pair being the frequency of said second cooperating acoustic energy source.

8. Apparatus as recited in claim 2 wherein
said first phase shift detecting means comprises first and second phase detectors one coupled to each acoustic sensor of said first pair of sensors and a first phase comparator coupled to said phase detectors and producing an output signal corresponding to said phase shift in said first sensor pair, and
said second phase shift detecting means comprises third and fourth phase detectors, one coupled to each acoustic sensor of said second pair of sensors and a second phase comparator coupled to said third and fourth phase detectors and producing an output signal corresponding to said phase shift in said second sensor pair.

9. Apparatus as recited in claim 8 wherein
each of said first and second means for separating said phase shift comprise a low pass filter and a high pass filter coupled in parallel to each of said first and second phase comparators whereby only substantially non-fluctuating wind error signals are passed by said low pass filter and fluctuating turbulence error signals are passed by said high pass filter.

10. Apparatus as recited in claim 9 wherein said error signal applying means comprises
a first summing amplifier coupled to said first phase comparator through said low pass filter and coupled to said second output of said array.
a second summing amplifier coupled to said first phase comparator through said high pass filter and coupled to said second output of said array,
a third summing amplifier coupled to said second phase comparator through said low pass filter and coupled to said first output of said array, and
a fourth summing amplifier coupled to said second phase comparator through said high pass filter and coupled to said first output of said array.

11. Apparatus as recited in claim 9 wherein
the cutoff frequency of said low pass filters is no greater than one Hz., and
the cuton frequency of said high pass filters is no less than one Hz.

References Cited

UNITED STATES PATENTS 2,965,879   12/1960   Lippel _____ 340—16

RICHARD A. FARLEY, Primary Examiner